United States Patent
Lee et al.

(10) Patent No.: US 11,736,218 B2
(45) Date of Patent: Aug. 22, 2023

(54) OBTAINING NEIGHBOR CELL CONTROL CHANNEL RESOURCES IN UNLICENSED BANDS

(71) Applicant: Intel Corporation, Santa Clara, CA (US)

(72) Inventors: Daewon Lee, Portland, OR (US); Yongjun Kwak, San Diego, CA (US); Bishwarup Mondal, San Ramon, CA (US); Seunghee Han, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 17/064,357

(22) Filed: Oct. 6, 2020

(65) Prior Publication Data
US 2021/0021363 A1    Jan. 21, 2021

Related U.S. Application Data

(60) Provisional application No. 62/923,823, filed on Oct. 21, 2019, provisional application No. 62/911,912, filed on Oct. 7, 2019.

(51) Int. Cl.
*H04W 48/10* (2009.01)
*H04J 11/00* (2006.01)
*H04W 24/10* (2009.01)

(52) U.S. Cl.
CPC ......... *H04J 11/0093* (2013.01); *H04W 24/10* (2013.01); *H04W 48/10* (2013.01)

(58) Field of Classification Search
CPC .............. H04J 11/0093; H04W 24/10; H04W 48/00–20; H04W 68/00–12; H04W 72/00–50
See application file for complete search history.

(56) References Cited

U.S. PATENT DOCUMENTS

| 2018/0192383 A1* | 7/2018 | Nam ............... H04W 72/23 |
| 2019/0149383 A1* | 5/2019 | Ko ................. H04L 5/0048 370/329 |

OTHER PUBLICATIONS

3GPP, "User Equipment (UE) radio transmission and reception; Part 1: Range 1 Standalone (Release 15)," 3GPP TS 38.101-1 V15.7.0 (Sep. 2019), 5G, 234 pages.
3GPP, "Base Station (BS) radio transmission and reception (Release 15)," 3GPP TS 38.104 V15.7.0 (Sep. 2019), 5G, 226 pages.
3GPP, "Physical channels and modulation (Release 15)," 3GPP TS 38.211 V15.7.0 (Sep. 2019), 5G, 97 pages.
3GPP, "Multiplexing and channel coding (Release 15)." 3GPP TS 38.212 V15.7.0 (Sep. 2019), 5G, 101 pages.

(Continued)

*Primary Examiner* — Ronald Eisner
(74) *Attorney, Agent, or Firm* — Schwabe, Williamson & Wyatt, P.C.

(57) ABSTRACT

Various embodiments herein provide techniques for indication of a starting frequency of a control resource set (CORESET). In embodiments, two modes for determining the starting frequency are provided. An access node (e.g., next generation Node B (gNB)) may send an indication to a user equipment (UE) to indicate which mode to use (e.g., in a payload of a physical broadcast channel (PBCH)). Other embodiments may be described and claimed.

6 Claims, 13 Drawing Sheets determining a resource block (RB) offset associated with a set of control resources
1202 encoding an indication of the RB offset in a system broadcast information
1204

(56) References Cited

OTHER PUBLICATIONS

3GPP, "Physical layer procedures for control (Release 15)," 3GPP TS 38.213 V15.7.0 (Sep. 2019), 5G, 108 pages.
3GPP, "Physical layer procedures for data (Release 15)," 3GPP TS 38.214 V15.7.0 (Sep. 2019), 5G, 106 pages.
3GPP, "Radio Resource Control (RRC) protocol specification (Release 15)," 3GPP TS 38.331 V15.7.0 (Sep. 2019), 5G, 527 pages.

* cited by examiner

OBTAINING NEIGHBOR CELL CONTROL CHANNEL RESOURCES IN UNLICENSED BANDS

CROSS REFERENCE TO RELATED APPLICATION

The present application claims priority to U.S. Provisional Patent Application No. 62/911,912, which was filed Oct. 7, 2019; U.S. Provisional Patent Application No. 62/923,823, which was filed Oct. 21, 2019; the disclosures of which are hereby incorporated by reference.

FIELD

Embodiments relate generally to the technical field of wireless communications.

BACKGROUND

A user equipment (UE) may be requested by the network to perform cell global identify (CGI) measurement and reporting. In this process, UE may need to detect synchronization signal of neighbor target cells, which is requested to perform CGI measurement, and receive and decode system broadcast information.

In New Radio (NR), in order to decode system broadcast information, UE needs to decode physical downlink control channel (PDCCH) that contains the scheduling information of physical downlink shared channel (PDSCH) that contains system broadcast information.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

UE may be requested by the network to perform cell global identify (CGI) measurement and reporting. In this process, UE may need to detect synchronization signal of neighbor target cells, which is requested to perform CGI measurement, and receive and decode system broadcast information.

In NR, in order to decode system broadcast information, UE needs to decode physical downlink control channel (PDCCH) that contains the scheduling information of physical downlink shared channel (PDSCH) that contains system broadcast information.

Reception of PDCCH requires the UE to know the information of the control resource set (CORESET) within the system bandwidth and the search space information. The CORESET information is obtained from synchronization signal and physical broadcast channel (SS/PBCH or SSB). CORESET is defined by one or more set of frequency resources that may be used for PDCCH transmission as well as the OFDM number of symbol that would span in time domain by single PDCCH. Search space information determines the subset of the resources that would be used by PDCCH within the CORESET and time domain monitoring instances.

Figure 1:
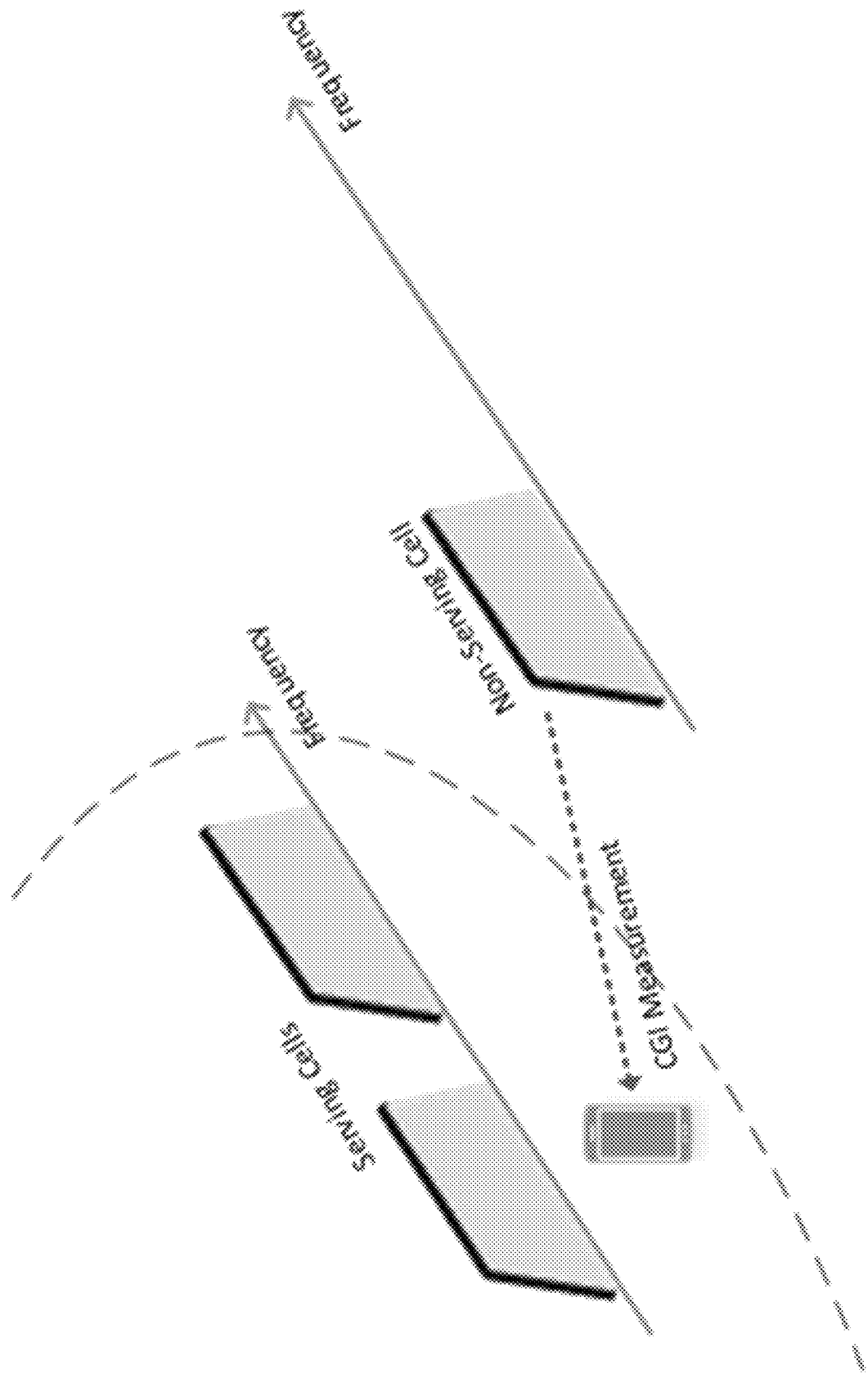
FIG. 1 illustrates an example of cell global identity (CGI) measurement in accordance with various embodiments.

Therefore, in order for the UE to perform CGI measurement UE needs to first understand the CORESET information of neighbor target cell (see FIG. 1).

NR operation in licensed band has various channel placement in frequency options, and various SS/PBCH placement in frequency options. The CORESET information signaled in SS/PBCH is indicated by providing a resource block (RB) offset between starting RB of the CORESET and starting RB of the SS/PBCH. The relative position in frequency of CORESET with respect to SS/PBCH.

Rel-15 NR specification, supports signaling of SSB to CORESET #0 offset using first 4 bits of PDCCH-ConfigSIB1 RRC parameter. This allows maximum of 16 entries to be signaled to indicate a combination of span of the CORESET (e.g., number of OFDM symbols for PDCCH), bandwidth of the CORESET, and SSB to CORESET #0 RB offset.

Alternatively, for cells that are transmitting system broadcast information such as SIB1 and is utilizing SSB that is transmitted on an off-raster frequency (e.g., not part of reference SSB frequencies), the CORESET #0 frequency location can be implicitly derived from addition of SSB to CORESET #0 RB offset indicated in the SSB and the frequency gap between SSB that is transmitted on an off-raster frequency and the reference SSB frequency for the cell.

Number of SSB to CORESET #0 offset that could be indicated was limited. In the Rel-15 NR specification, less than 5 offset values for a given CORESET bandwidth, SSB and CORESET #0 subcarrier spacing is supported.

In case of non-coexistence cases where 20 MHz channel bandwidth cells may be defined in overlapping manner, implicit derivation using combination of SSB to CORESET #0 offset indication and SSB and the frequency gap between SSB that is transmitted on an off-raster frequency and the reference SSB frequency for the cell does not work at all.

Various embodiments described herein may allow higher degree of configuration and/or allow support of unlicensed cells in non-coexistence cases and/or coexistence cases.

Embodiments include to send indication of the payload of PBCH that differentiates two modes of indicating frequency domain placement of CORESET. The first mode utilizes a combination of the RB offset signaling and frequency gap between the SS/PBCH that indication was conveyed and reference SS/PBCH frequency for a given frequency range. The second mode utilizes RB offset signaling.

The support of two modes, as described herein, will allow to support various NR deployment scenarios in unlicensed spectrum.

Method 1 of CORESET #0 Indication for SSB

In method 1, it is assumed that there is only 1 SSB raster entry per 20 MHz channel boundary, where the 20 MHz channel boundary are frequency ranges of units of 20 MHz that divides up the unlicensed spectrum into usable frequency chunks. Additionally, it is assumed that cells that operate with specific bandwidth, e.g. 20 MHz, may not partially overlap. For example, within the 20 MHz channel boundary, there would be only 1 frequency position that cells operating 20 MHz can fit in. Examples of 20 MHz channel boundaries are provided by start and end frequencies in Table 1.

TABLE 1

| UNII Band | Center Frequency [kHz] | Start Frequency [kHz] | End Frequency [kHz] |
| --- | --- | --- | --- |
| 1 | 5160000 | 5060000 | 5260000 |
| 1 | 5180000 | 5080000 | 5280000 |
| 1 | 5200000 | 5100000 | 5300000 |
| 1 | 5220000 | 5120000 | 5320000 |
| 1 | 5240000 | 5140000 | 5340000 |
| 1 | 5260000 | 5160000 | 5360000 |
| 1 | 5280000 | 5180000 | 5380000 |
| 1 | 5300000 | 5200000 | 5400000 |
| 1 | 5320000 | 5220000 | 5420000 |
| 1 | 5340000 | 5240000 | 5440000 |
| 2 | 5480000 | 5380000 | 5580000 |
| 2 | 5500000 | 5400000 | 5600000 |
| 2 | 5520000 | 5420000 | 5620000 |
| 2 | 5540000 | 5440000 | 5640000 |
| 2 | 5560000 | 5460000 | 5660000 |
| 2 | 5580000 | 5480000 | 5680000 |
| 2 | 5600000 | 5500000 | 5700000 |
| 2 | 5620000 | 5520000 | 5720000 |

TABLE 1-continued

| UNII Band | Center Frequency [kHz] | Start Frequency [kHz] | End Frequency [kHz] |
| --- | --- | --- | --- |
| 2 | 5640000 | 5540000 | 5740000 |
| 2 | 5660000 | 5560000 | 5760000 |
| 2 | 5680000 | 5580000 | 5780000 |
| 2 | 5700000 | 5600000 | 5800000 |
| 2 | 5720000 | 5620000 | 5820000 |
| 3 | 5745000 | 5645000 | 5845000 |
| 3 | 5765000 | 5665000 | 5865000 |
| 3 | 5785000 | 5685000 | 5885000 |
| 3 | 5805000 | 5705000 | 5905000 |
| 3 | 5825000 | 5725000 | 5925000 |
| 3 | 5845000 | 5745000 | 5945000 |
| 3 | 5865000 | 5765000 | 5965000 |
| 3 | 5885000 | 5785000 | 5985000 |
| 3 | 5905000 | 5805000 | 6005000 |

Under these assumptions, CORESET #0 frequency starting point is determined by the SSB frequency starting point, and the SSB-CORESET #0 offset indication carried by SSB. More specifically, the frequency starting point for CORESET #0 is determined by SSB-CORESET #0 offset indication plus offset between reference SSB frequency position and current detected SSB frequency position, which carries the SSB-CORESET #0 offset indication. The reference SSB frequency positions are referred here as on-raster SSB. The reference SSB frequency positions are the single predefined SSB frequency position within the 20 MHz channel boundary for each channel chunk in unlicensed spectrum.

If SSB that is not on-raster (e.g. not transmitted on a reference SSB frequency position), the offset between reference SSB frequency position and current detected SSB frequency position will be an non-zero value. If SSB is on-raster, then the offset between reference SSB frequency position and current detected SSB frequency position will be zero. An illustration of method of obtaining CORESET #0 starting frequency position based on method 1 is shown in FIG. 2.

Figure 2:
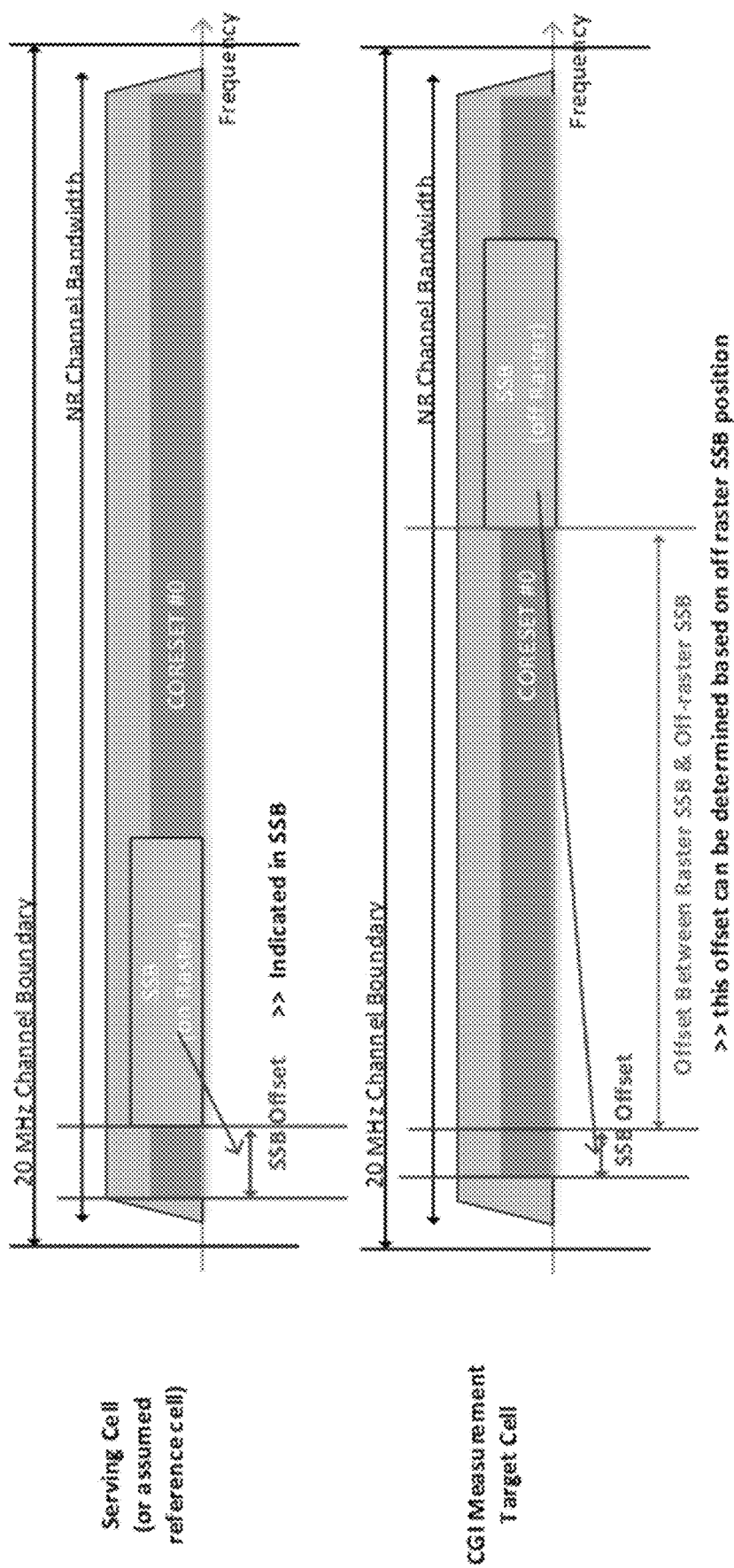
FIG. 2 illustrates a first method of obtaining CORESET #0 starting frequency position, in accordance with various embodiments.

In FIG. 2, the top figure represents an example of either serving cell that has SSB on raster or a hypothetical reference cell that would exist if SSB is on raster. The Bottom figure represents the target neighbor cell that UE needs to perform CGI measurement. In order for the UE to decode the system broadcast information, it first needs to obtain the CORESET #0 information from the detected SSB, which is off raster points. The determination of the frequency position of CORESET #0 is done by adding the signaled SSB-CORESET #0 offset value and offset between the detected SSB and reference SSB for the 20 MHz channel.

In method 1, the UE must (first) determine the frequency range of the 20 MHz channel boundary, (second) find the reference SSB raster frequency within the frequency range of the 20 MHz channel boundary, (third) derive the frequency gap between the target SSB and the reference SSB frequency and use the frequency gap in the determination of the frequency position of the CORESET #0.

In general determination of the frequency range of the 20 MHz channel boundary could be difficult depending on how the 20 MHz channel boundary is defined and placement of the reference SSB frequencies.

An alternative method to avoid the determination of the frequency position and have the UE be able to derive the frequency gap between target SSB frequency and reference SSB frequency could be done with assistance information from the gNB.

In the variation of the method 1, denoted as method 1A, UE determines the reference SSB frequency as either (approach 1) frequency among the list of SSB raster entries that is closest (i.e. nearest) to the target SSB frequency and smaller of equal to the target SSB frequency, or (approach 2) frequency among the list of SSB raster entries that is closest (i.e. nearest) to the target SSB frequency and larger of equal to the target SSB frequency. The gNB may indicate which approach the reference SSB frequency is determined using assistance information.

For example, assume that the set of reference SSB entries are {5155680, 5175840, 5196000, 5214720, 5234880, 5255040, 5275200, 5295360, 5315520, 5335680, 5475360, 5495520, 5515680, 5535840, 5556000, 5574720, 5594880, 5615040, 5635200, 5655360, 5675520, 5695680, 5715840, 5740320, 5760480, 5780640, 5800800, 5820960, 5839680, 5859840, 5880000, 5900160} kHz.

If the target SSB frequency is 526500 kHz, using approach 1, the reference SSB frequency would be 5255050 kHz and using approach 2, the reference SSB frequency would be 5275200 kHz.

The assistance information may be an explicit indication that is indicated by higher layers. One example is as part of measurement object configuration used to configure the UE to perform monitoring of the CGI reporting.

The assistance information may be an explicit indication that is indicated in MIB.

The assistance information may be an implicit indication that is indicated in MIB. For example, depending on the set of entries of SSB-CORESET #0 offset is indicated in the MIB, UE will use approach 1 or 2. Some examples of SSB-CORESET #0 offset implicitly indicating CORESET frequency determination approach 1 or 2 is shown in Table 2 and Table 3. In Table 2, index {0,1,2,3} implicitly indicate to the UE that approach 1 should be used to determine the CORESET frequency location and index {4,5,6,7} implicitly indicate to the UE that approach 2 should be used to determine the CORESET frequency location.

TABLE 2

| Index | SS/PBCH block and CORESET multiplexing pattern | Number of RBs $N_{RB}^{CORESET}$ | Number of Symbols $N_{symb}^{CORESET}$ | Offset (RBs) | CORESET determination Approach |
|---|---|---|---|---|---|
| 0 | 1 | 48 | 1 | 0 | 1 |
| 1 | 1 | 48 | 1 | 1 | 1 |
| 2 | 1 | 48 | 2 | 0 | 1 |
| 3 | 1 | 48 | 2 | 1 | 1 |
| 4 | 1 | 48 | 1 | 0 | 2 |
| 5 | 1 | 48 | 1 | 1 | 2 |
| 6 | 1 | 48 | 2 | 0 | 2 |
| 7 | 1 | 48 | 2 | 1 | 2 |
| 8 | | | | | |
| 9 | | | | | |
| 10 | | | | | |
| 11 | | | | | |
| 12 | | | | | |
| 13 | | | | | |
| 14 | | | | | |
| 15 | | | | | |

TABLE 3

| Index | SS/PBCH block and CORESET multiplexing pattern | Number of RBs $N_{RB}^{CORESET}$ | Number of Symbols $N_{symb}^{CORESET}$ | Offset (RBs) | CORESET determination Approach |
|---|---|---|---|---|---|
| 0 | 1 | 48 | 1 | −1 | 1 |
| 1 | 1 | 48 | 1 | 0 | 1 |
| 2 | 1 | 48 | 1 | 1 | 1 |
| 3 | 1 | 48 | 2 | 1 | 1 |
| 4 | 1 | 48 | 2 | 0 | 1 |
| 5 | 1 | 48 | 2 | 1 | 1 |
| 6 | 1 | 48 | 1 | −1 | 1 |
| 7 | 1 | 48 | 1 | 0 | 2 |
| 8 | 1 | 48 | 1 | 1 | 2 |
| 9 | 1 | 48 | 2 | −1 | 2 |
| 10 | 1 | 48 | 2 | 0 | 2 |
| 11 | 1 | 48 | 2 | 1 | 2 |
| 12 | | | | | |
| 13 | | | | | |
| 14 | | | | | |
| 15 | | | | | |

One of the issues with method 1 approach to obtaining CORESET #0 frequency location is that it does not work when assumptions of cell bandwidth placement is not met. For example, if system bandwidth of a cell can be placed in any frequency location, it can be problematic for method 1 approach. Such situations may occur in non-coexistence scenarios, where NR cells do not necessarily need to align the transmission bandwidth with other radio systems, such as 802.11 systems.

Figure 3:
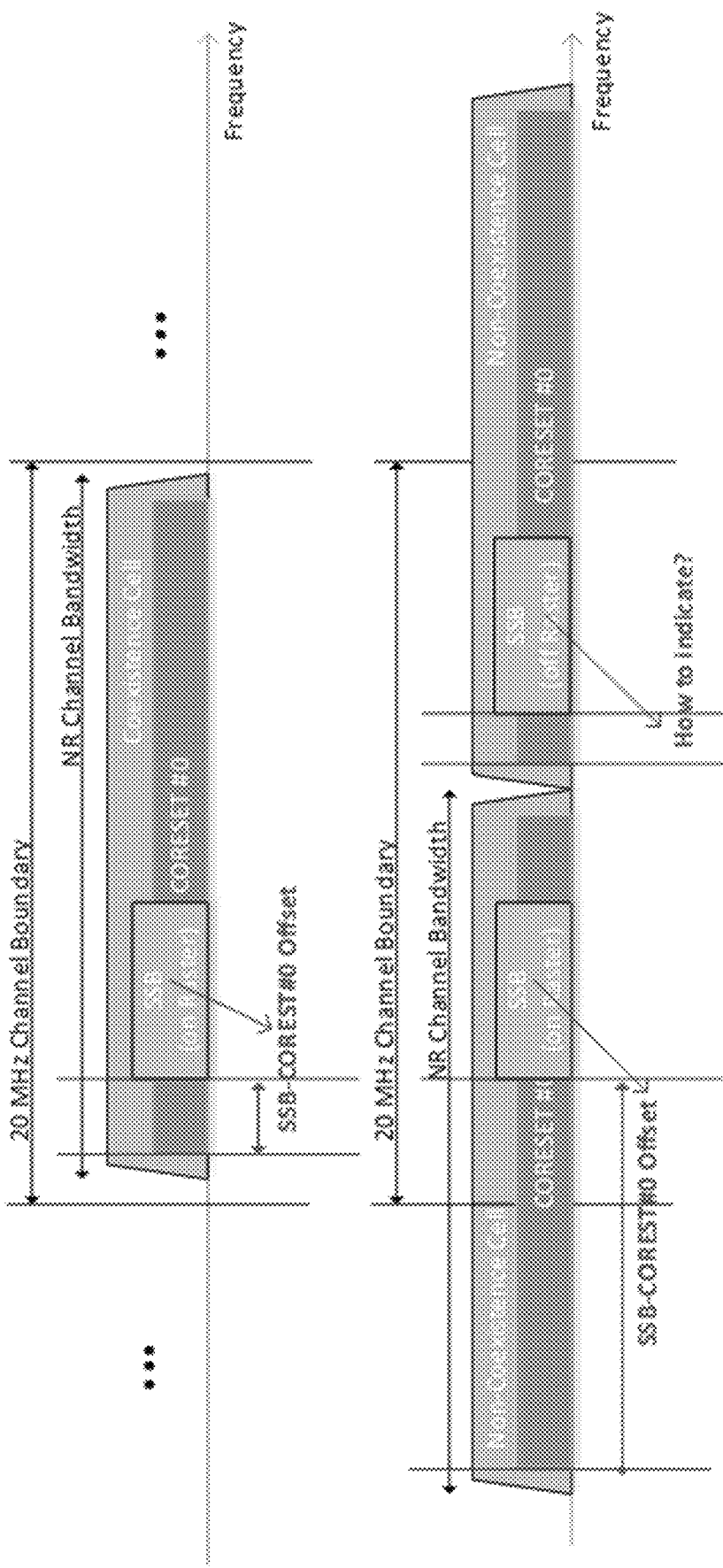
FIG. 3 illustrates an of CGI measurement in non-coexistence scenarios, in accordance with various embodiments.

An example is illustrated in FIG. 3. In FIG. 3, the neighbor target cell for CGI measurement is in the bottom right side of the Figure. The system bandwidth of the target cell for CGI measurement is not confined to 20 MHz channel boundary and is across the 20 MHz channel chunks. The target cell is transmitting SSB on an off raster position. FIG. 3 also shows other hypothetical cells (bottom right and top) that either confined to the 20 MHz channel boundary or is not confined to the 20 MHz channel boundary but both are transmitting SSB on raster. In such scenario, it may not be possible use method 1 to obtain the CORESET #0 frequency position location since the offset between SSB off raster and reference SSB (e.g. on raster) has no relevance to the CORESET #0 frequency position for the cell that is transmitting SSB off raster point.

To overcome this issue, method 2 approach is provided and described below.

Method 2 of CORESET #0 Indication for SSB

Figure 4:
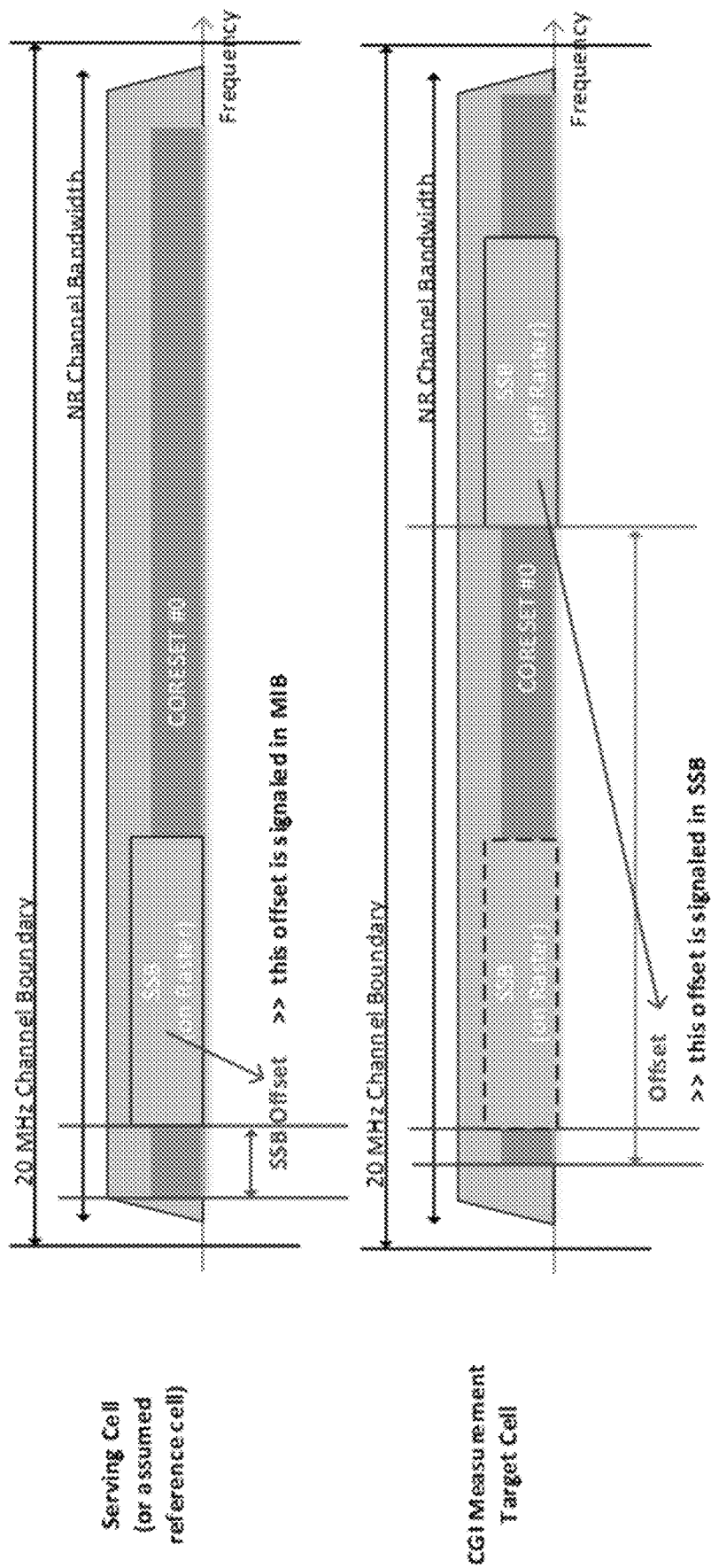
FIG. 4 illustrates a second method of obtaining CORESET #0 starting frequency position, in accordance with various embodiments.

In method 2 the CORESET #0 position is directly indicated by signaling in the SSB. FIG. 4 shows an illustration of the method 2 approach. The SSB may carry signaling for offset that directly indicates the RB offset between start of CORESET #0 frequency position and start of SSB frequency position.

Figure 5:
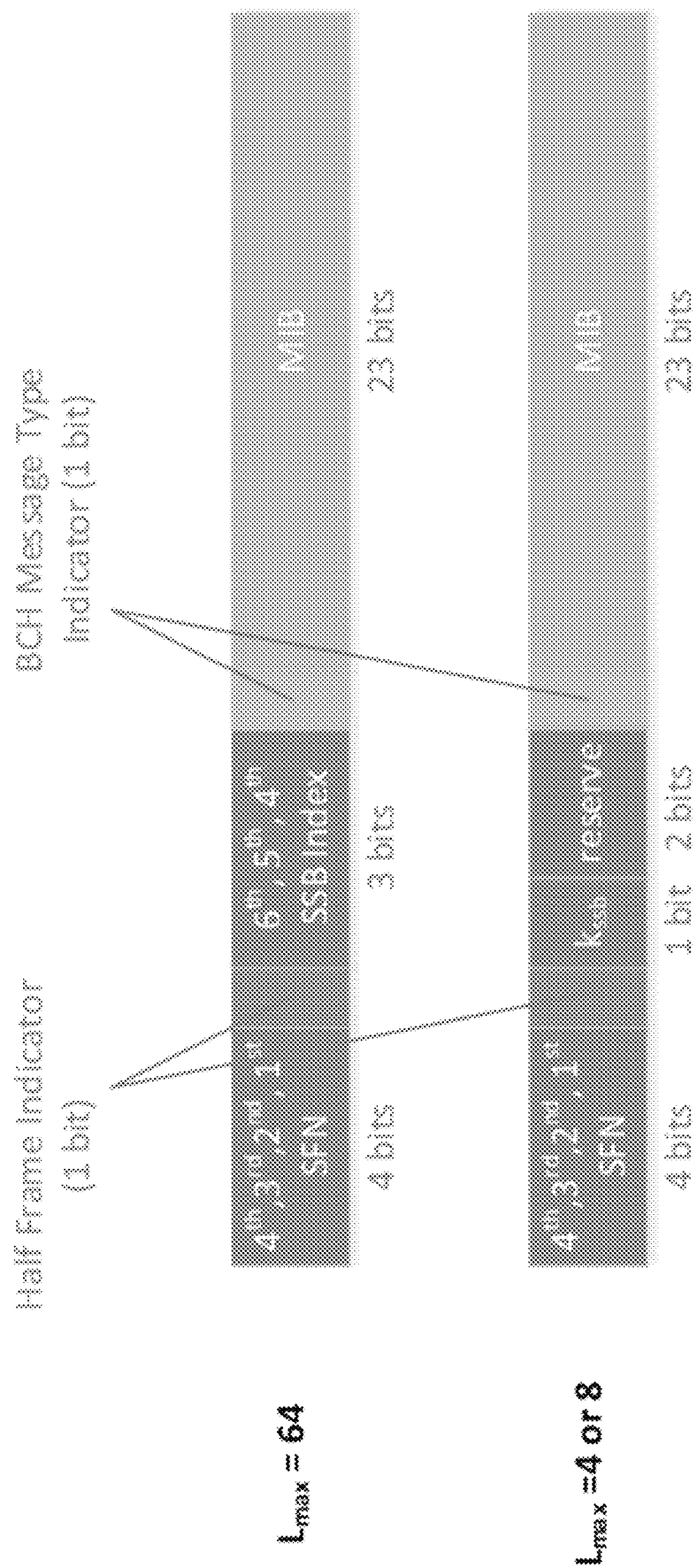
FIG. 5 illustrates a physical broadcast channel (PBCH) information payload, in accordance with various embodiments.

The information payload of PBCH of SSB consists of 4 bits of SFN, 1 bit of half radio frame indicator, 3 bits of SSB index (or 1 bit of k_ssb MSB and 2 bits of reserved field), 1 bit choice indication for BCH message type, and master information block (MIB). FIG. 5 shows an illustration of the PBCH information payload.

The MIB consists of systemFrameNumber, subCarrierSpacingCommon, ssb-SubcarrierOffset (i.e. k_ssb signaling), dmrs-TypeA-Position, pdcch-ConfigSIB1, cellBarred, intraFreqReselection, and spare fields. More detailed ASN.1 description of the MIB and broadcast channel description is shown below.

```
BCCH-BCH-Message ::= SEQUENCE {
  message BCCH-BCH-MessageType
}
BCCH-BCH-MessageType ::= CHOICE {
  mib MIB,
  messageClassExtension SEQUENCE { }
}
MIB ::= SEQUENCE {
  systemFrameNumber BIT STRING (SIZE (6)),
  subCarrierSpacingCommon ENUMERATED {scs15or60, scs30or120},
  ssb-SubcarrierOffset INTEGER (0..15),
  dmrs-TypeA-Position ENUMERATED {pos2, pos3},
  pdcch-ConfigSIB1 PDCCH-ConfigSIB1,
  cellBarred ENUMERATED {barred, notBarred},
  intraFreqReselection ENUMERATED {allowed, notAllowed},
  spare BIT STRING (SIZE (1))
  }
```

The RB offset signaling can be conducted using PDCCH-ConfigSIB1 parameter in MIB. More specifically, the first 4 bits of the PDCCH-ConfigSIB1 may indicate 1 entry among 16 possible entry that indicate a combination of SSB to CORESET #0 RB offset, number of OFDM symbol for PDCCH that are transmitted in CORESET #0, and frequency bandwidth of CORESET #0.

Figure 6:
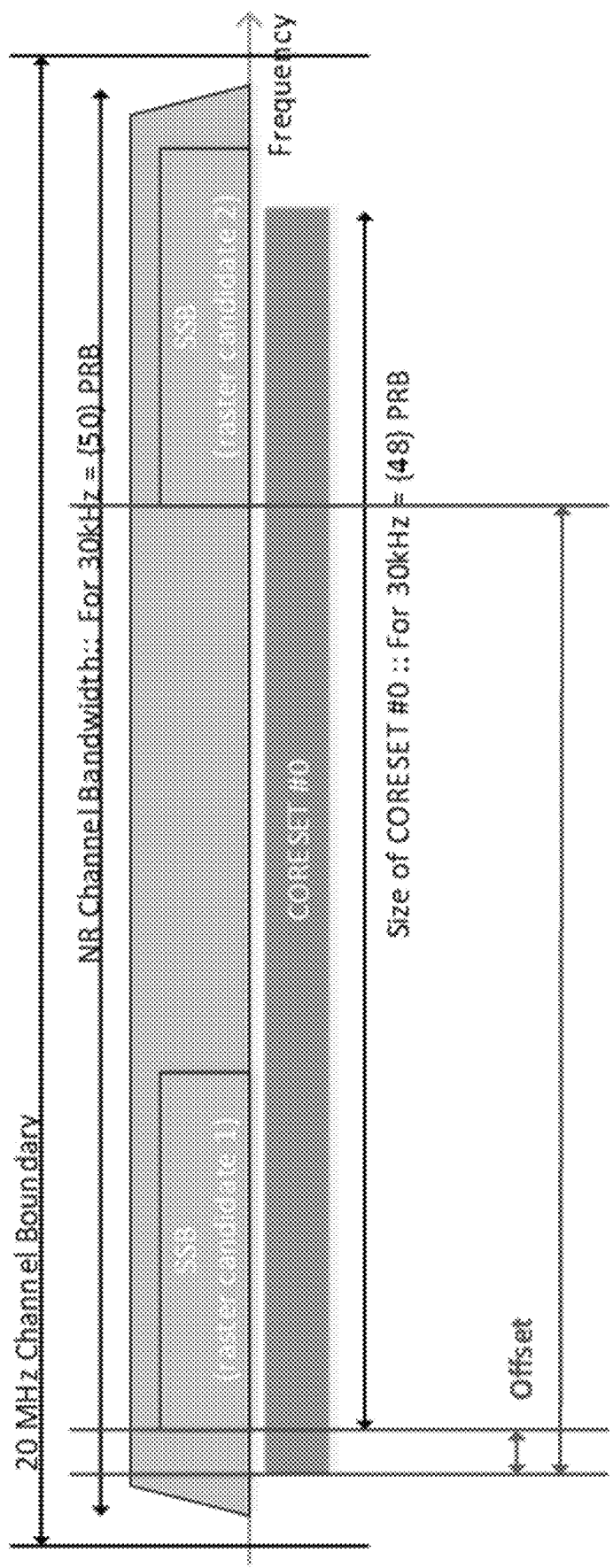
FIG. 6 illustrates an example of offset values relative to the reference SSB candidate positions, in accordance with various embodiments.

For example of the first 4 bits of the PDCCH-ConfigSIB1 may indicate parameters entries in Table 2. The offset in Table 4 is respect to the 30 kHz subcarrier spacing of the CORESET for Type0-PDCCH CSS set, and defined as the frequency difference in units of RB in 30 kHz subcarrier spacing from the smallest RB index of the CORESET for Type0-PDCCH CSS set to the smallest RB index of the common RB overlapping with the first RB of the corresponding SS/PBCH block. Assuming an 50 RB system bandwidth using 30 kHz subcarrier spacing, offset values larger than 20 would be needed to support reference SSB placement in the right side of the 20 MHz channel, and offset values smaller than 20 would be need to support reference SSB placement in the left side of the 20 MHz channel. FIG. 6 shows an example of offset values relative to the reference SSB candidate positions.

TABLE 4

| Index | SS/PBCH block and CORESET multiplexing pattern | Number of RBs $N_{RB}^{CORESET}$ | Number of Symbols $N_{symb}^{CORESET}$ | Offset (RBs) |
| --- | --- | --- | --- | --- |
| 0 | 1 | 48 | 1 | 0 |
| 1 | 1 | 48 | 1 | 1 |
| 2 | 1 | 48 | 1 | 2 |
| 3 | 1 | 48 | 1 | 3 |
| 4 | 1 | 48 | 1 | 27 |
| 5 | 1 | 48 | 1 | 28 |
| 6 | 1 | 48 | 1 | 29 |
| 7 | 1 | 48 | 1 | 30 |
| 8 | 1 | 48 | 2 | 0 |
| 9 | 1 | 48 | 2 | 1 |
| 10 | 1 | 48 | 2 | 2 |
| 11 | 1 | 48 | 2 | 3 |
| 12 | 1 | 48 | 2 | 27 |
| 13 | 1 | 48 | 2 | 28 |
| 14 | 1 | 48 | 2 | 29 |
| 15 | 1 | 48 | 2 | 30 |

Alternatively, if ssb-SubcarrierOffset (e.g., k_ssb) signaling is not required in unlicensed bands, the field can be repurposed to explicitly indicate SSB to CORESET #0 RB offset. The 4 bits would be used to explicitly indicate the frequency difference in units of RB in 30 kHz subcarrier spacing from the smallest RB index of the 30 kHz subcarrier spacing CORESET for Type0-PDCCH CSS set to the smallest RB index of the common RB overlapping with the first RB of the corresponding SS/PBCH block.

Alternatively, offset indication in PDCCH-ConfigSIB1 and offset indication in repurposed ssb-SubcarrierOffset can be used together, where the UE determines the final offset between SSB and CORESET #0 by adding the two indicated offset together.

For example, an offset indicated in PDCCH-ConfigSIB1 may indicate value of {0,1,2,3} and offset indicated in repurposed ssb-SubcarrierOffset may indicate value of {0,4, 8,12, 16,20,24,28}. The final offset could be sum of the two indicated values, which allows gNB to indicate any final offset value ranging from 0 to 31.

In another example, offset indicated in PDCCH-ConfigSIB1 may indicate value of {0,1,2,3, 28,29,30,31} and offset indicated in repurposed ssb-SubcarrierOffset may indicate value of {0,4,8,12} or {0, −4, −8, −12} depending on whether offset indicated in PDCCH-ConfigSIB1 is {0,1, 2,3} or {28,29,30,31}, respectively. The final offset could be sum of the two indicated values, which allows gNB to indicate any final offset value ranging from 0 to 31.

Support of Both Method 1 and 2 of CORESET #0 Indication for SSB

It may be possible to support both method 1 and 2 approach for indicating CORESET #0 location in SSB. This can be done by 1 bit signaling in SSB. One example of how this could be done is by repurposing subCarrierSpacingCommon parameter in the MIB. Instead using the subCarrierSpacingCommon parameter to indicate the subcarrier spacing of the CORESET #0, it may be assumed that for unlicensed operation in 5 and 6 GHz frequency bands, 30 kHz is always used for CORESET #0 and subCarrierSpacingCommon parameter indicates whether CORESET #0 location should be determined using method 1 or 2 approach.

Note on Start Frequency

In the disclosure described above the start frequency of SSB may refer to the first subcarrier frequency position of 20 PRB SSB, or it may refer to the first subcarrier of the common resource block that overlaps with 20 PRB SSB.

Systems and Implementations

Figure 7:
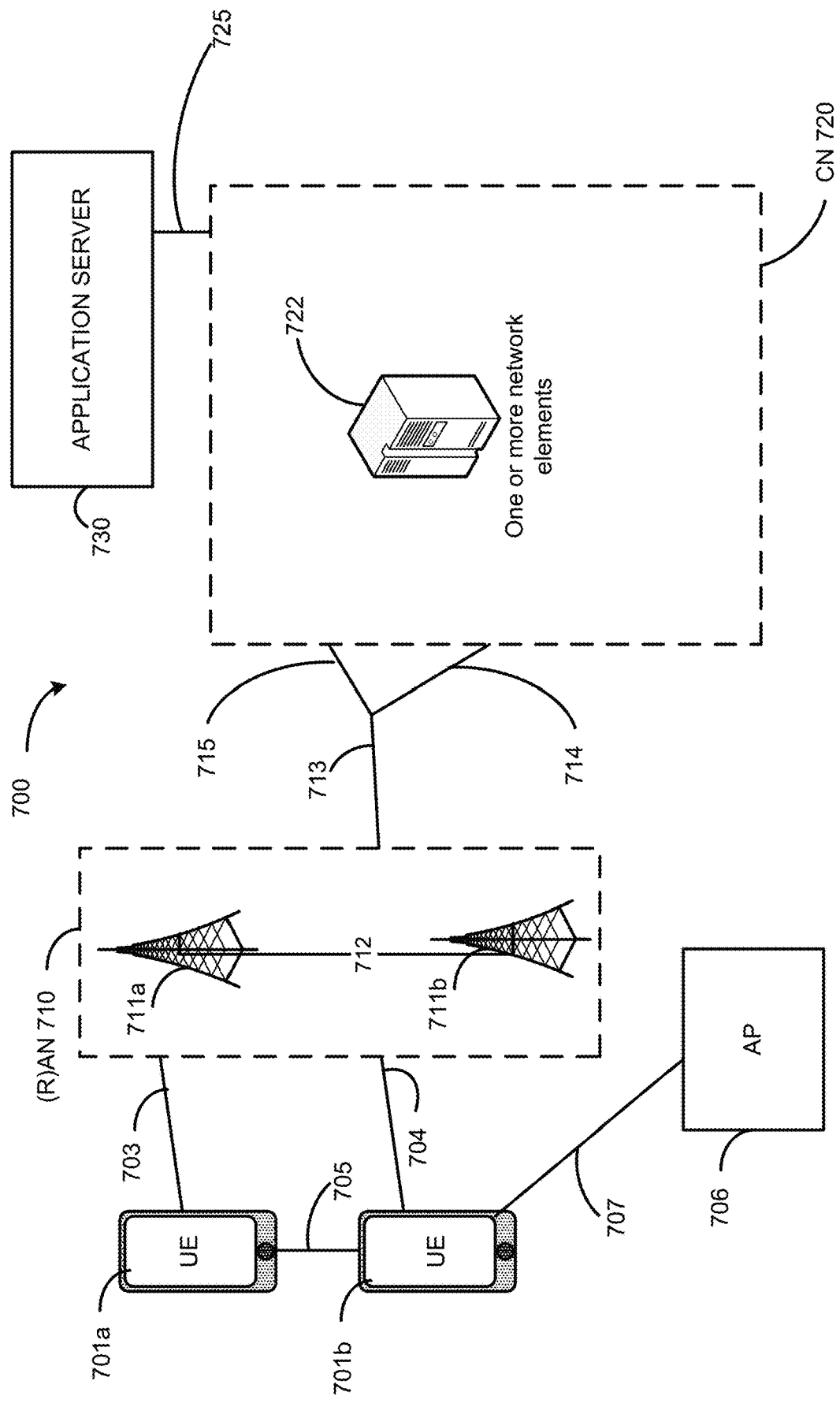
FIG. 7 illustrates an example architecture of a system of a network, in accordance with various embodiments.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 701a and UE 701b (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 may be configured to connect, for example, communicatively couple, with an or RAN 710. In embodiments, the RAN 710 may be an NG RAN or a 5G RAN, an E-UTRAN, or a legacy RAN, such as a UTRAN or GERAN. As used herein, the term "NG RAN" or the like may refer to a RAN 710 that operates in an NR or 5G system 700, and the term "E-UTRAN" or the like may refer to a RAN 710 that operates in an LTE or 4G system 700. The UEs 701 utilize connections (or channels) 703 and 704, respectively, each of which comprises a physical communications interface or layer (discussed in further detail below).

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 701 may directly exchange communication data via a ProSe interface 705. The ProSe interface 705 may alternatively be referred to as a SL interface 705 and may comprise one or more logical channels, including but not limited to a PSCCH, a PSSCH, a PSDCH, and a PSBCH.

The UE 701b is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation. The LWA operation may involve the UE 701b in RRC_CONNECTED being configured by a RAN node 711a-b to utilize radio resources of LTE and WLAN. LWIP operation may involve the UE 701b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (for example, a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 711; a MAC/PHY split wherein RRC, PDCP, RLC, and MAC layers are operated by the CRAN/vBBUP and the PHY layer is operated by individual RAN nodes 711; or a "lower PHY" split wherein RRC, PDCP, RLC, MAC layers and upper portions of the PHY layer are operated by the CRAN/vBBUP and lower portions of the PHY layer are operated by individual RAN nodes 711. This virtualized framework allows the freed-up processor cores of the RAN nodes 711 to perform other virtualized applications. In some implementations, an individual RAN node 711 may represent individual gNB-DUs that are connected to a gNB-CU via individual F1 interfaces (not shown by FIG. 7). In these implementations, the gNB-DUs may include one or more remote radio heads or RFEMs (see, e.g., FIG. 8), and the gNB-CU may be operated by a server that is located in the RAN 710 (not shown) or by a server pool in a similar manner as the CRAN/vBBUP. Additionally or alternatively, one or more of the RAN nodes 711 may be next generation eNBs (ng-eNBs), which are RAN nodes that provide E-UTRA user plane and control plane protocol terminations toward the UEs 701, and are connected to a 5GC via an NG interface (discussed infra).

In V2X scenarios one or more of the RAN nodes 711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs 701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 to the UEs 701, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 701. The PDCCH carries information about the transport format and resource allocations related to the PDSCH channel, among other things. It may also inform the UEs 701 about the transport format, resource allocation, and HARQ information related to the uplink shared channel. Typically, downlink scheduling (assigning control and shared channel resource blocks to the UE 701*b* within a cell) may be performed at any of the RAN nodes 711 based on channel quality information fed back from any of the UEs 701. The downlink resource assignment information may be sent on the PDCCH used for (e.g., assigned to) each of the UEs 701.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

The RAN nodes 711 may be configured to communicate with one another via interface 712. In embodiments where the system 700 is an LTE system (e.g., when CN 720 is an EPC), the interface 712 may be an X2 interface 712. The X2 interface may be defined between two or more RAN nodes 711 (e.g., two or more eNBs and the like) that connect to EPC 720, and/or between two eNBs connecting to EPC 720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 701 from an SeNB for user data; information of PDCP PDUs that were not delivered to a UE 701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 700 is a 5G or NR system (e.g., when CN 720 is an 5GC), the interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network in this embodiment, core network (CN) 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the EPC 720.

In embodiments, the CN 720 may be a 5GC (referred to as "5GC 720" or the like), and the RAN 710 may be connected with the CN 720 via an NG interface 713. In embodiments, the NG interface 713 may be split into two parts, an NG user plane (NG-U) interface 714, which carries traffic data between the RAN nodes 711 and a UPF, and the S1 control plane (NG-C) interface 715, which is a signaling interface between the RAN nodes 711 and AMFs.

In embodiments, the CN 720 may be a 5G CN (referred to as "5GC 720" or the like), while in other embodiments, the CN 720 may be an EPC). Where CN 720 is an EPC (referred to as "EPC 720" or the like), the RAN 710 may be connected with the CN 720 via an S1 interface 713. In embodiments, the S1 interface 713 may be split into two parts, an S1 user plane (S1-U) interface 714, which carries traffic data between the RAN nodes 711 and the S-GW, and the S1-MME interface 715, which is a signaling interface between the RAN nodes 711 and MMES.

Figure 8:
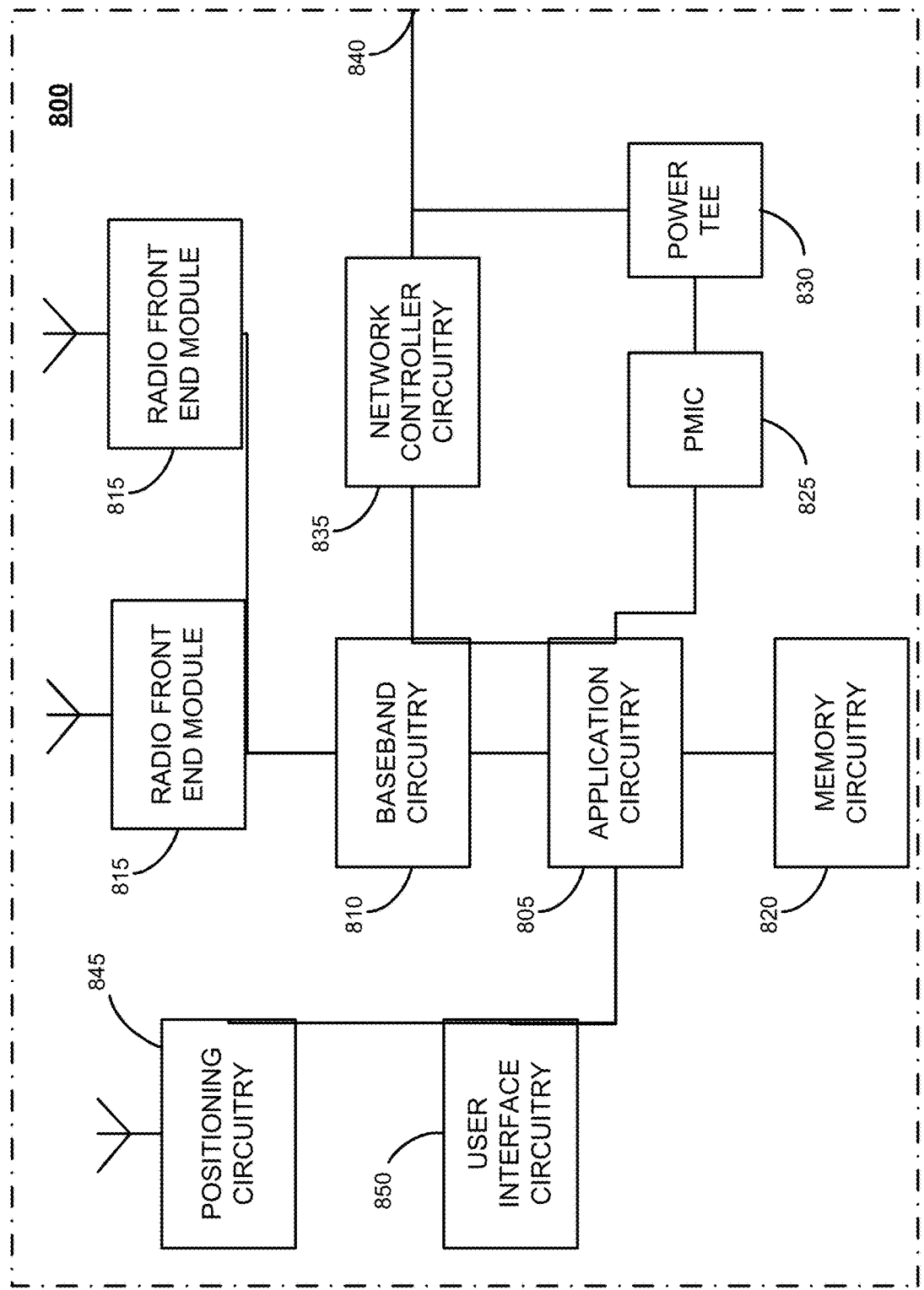
FIG. 8 illustrates an example of infrastructure equipment in accordance with various embodiments.

FIG. 8 illustrates an example of infrastructure equipment 800 in accordance with various embodiments. The infrastructure equipment 800 (or "system 800") may be implemented as a base station, radio head, RAN node such as the RAN nodes 711 and/or AP 706 shown and described previously, application server(s) 730, and/or any other element/device discussed herein. In other examples, the system 800 could be implemented in or by a UE.

The system 800 includes application circuitry 805, baseband circuitry 810, one or more radio front end modules (RFEMs) 815, memory circuitry 820, power management integrated circuitry (PMIC) 825, power tee circuitry 830, network controller circuitry 835, network interface connector 840, satellite positioning circuitry 845, and user interface 850. In some embodiments, the device 800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 805 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 805 may comprise, or may be, a special-purpose processor/controller to operate according to the various embodiments herein. As examples, the processor(s) of application circuitry 805 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 800 may not utilize application circuitry 805, and instead may include a special-purpose processor/controller to process IP data received from an EPC or 5GC, for example.

In some implementations, the application circuitry 805 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to FIG. 10.

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1011 of FIG. 10 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 may provide for electrical power drawn from a network cable to provide both power supply and data connectivity to the infrastructure equipment 800 using a single cable.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocols. In some implementations, the network controller circuitry 835 may include multiple controllers to provide connectivity to other networks using the same or different protocols.

The positioning circuitry 845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-Technology for Positioning, Navigation, and Timing (Micro-PNT) IC that uses a master timing clock to perform position tracking/estimation without GNSS assistance. The positioning circuitry 845 may also be part of, or interact with, the baseband circuitry 810 and/or RFEMs 815 to communicate with the nodes and components of the positioning network. The positioning circuitry 845 may also provide position data and/or time data to the application circuitry 805, which may use the data to synchronize operations with various infrastructure (e.g., RAN nodes 711, etc.), or the like.

The components shown by FIG. 8 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I²C interface, an SPI interface, point to point interfaces, and a power bus, among others.

Figure 9:
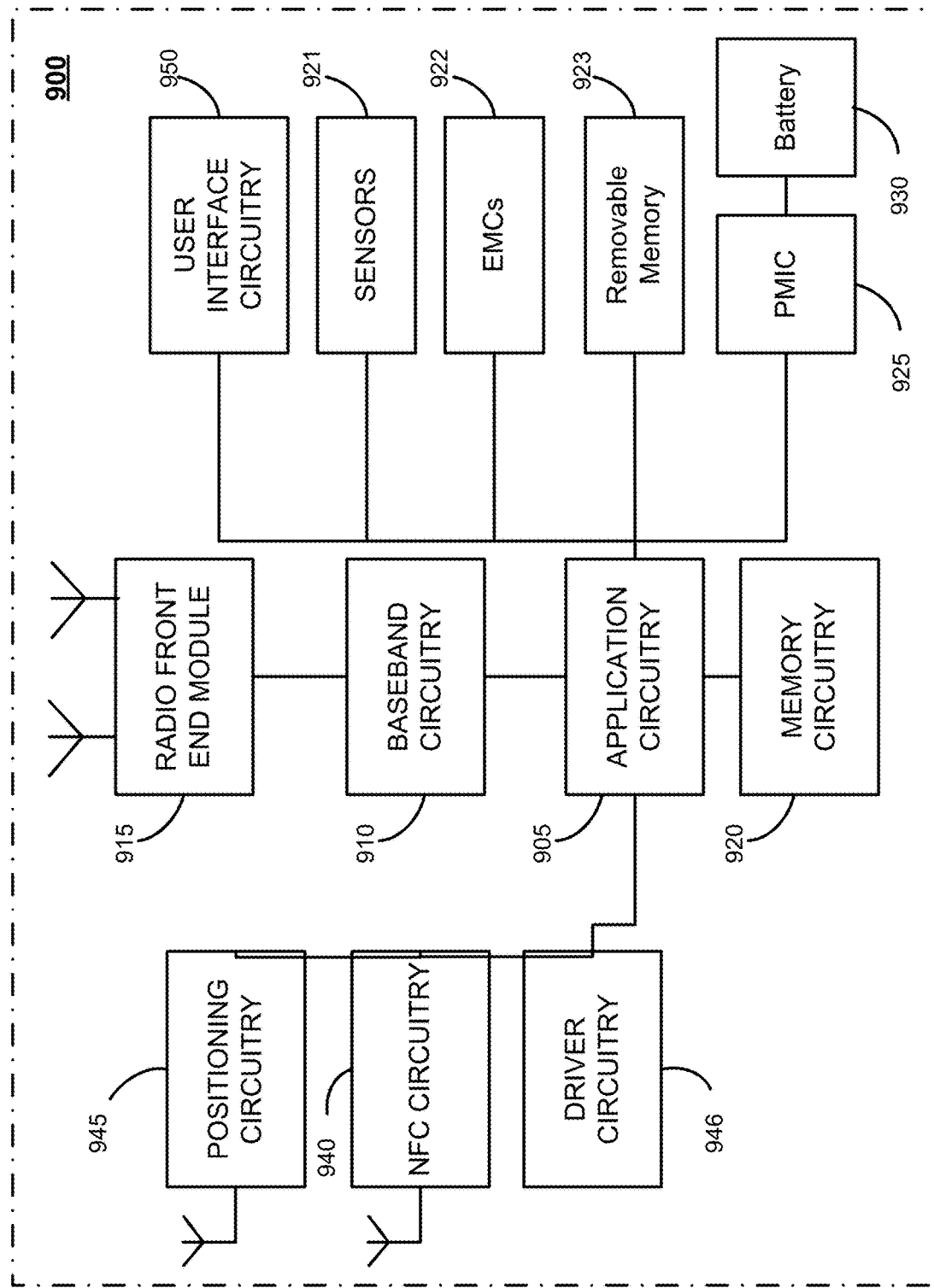
FIG. 9 illustrates an example of a computer platform in accordance with various embodiments.

FIG. 9 illustrates an example of a platform 900 (or "device 900") in accordance with various embodiments. In embodiments, the computer platform 900 may be suitable for use as UEs 701, application servers 730, and/or any other element/device discussed herein. The platform 900 may include any combinations of the components shown in the example. The components of platform 900 may be implemented as integrated circuits (ICs), portions thereof, discrete electronic devices, or other modules, logic, hardware, software, firmware, or a combination thereof adapted in the computer platform 900, or as components otherwise incorporated within a chassis of a larger system. The block diagram of FIG. 9 is intended to show a high level view of components of the computer platform 900. However, some of the components shown may be omitted, additional components may be present, and different arrangement of the components shown may occur in other implementations.

Application circuitry 905 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 905 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 805 may comprise, or may be, a special-purpose processor/controller to operate according to the various embodiments herein.

As examples, the processor(s) of application circuitry 905 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 905 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 905 may be a part of a system on a chip (SoC) in which the application circuitry 905 and other components are formed into a single integrated circuit, or a single package, such as the Edison™ or Galileo™ SoC boards from Intel® Corporation.

Additionally or alternatively, application circuitry 905 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 905 may comprise logic blocks or logic fabric, and other interconnected resources that may be programmed to perform various functions, such as the procedures, methods, functions, etc. of the various embodiments discussed herein. In such embodiments, the circuitry of application circuitry 905 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 910 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 910 are discussed infra with regard to FIG. 10.

The RFEMs 915 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1011 of FIG. 10 infra), and the RFEM may be connected to multiple antennas. In alternative implementations, both mmWave and sub-mmWave radio functions may be implemented in the same physical RFEM 915, which incorporates both mmWave antennas and sub-mmWave.

The memory circuitry 920 may include any number and type of memory devices used to provide for a given amount of system memory. As examples, the memory circuitry 920 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 920 may be developed in accordance with a Joint Electron Devices Engineering Council (JEDEC) low power double data rate (LPDDR)-based design, such as LPDDR2, LPDDR3, LPDDR4, or the like. Memory circuitry 920 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 920 may be on-die memory or registers associated with the application circuitry 905. To provide for persistent storage of information such as data, applications, operating systems and so forth, memory circuitry 920 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 900 may incorporate the three-dimensional (3D) cross-point (XPOINT) memories from Intel® and Micron®.

Removable memory circuitry 923 may include devices, circuitry, enclosures/housings, ports or receptacles, etc. used to couple portable data storage devices with the platform 900. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 900 may also include interface circuitry (not shown) that is used to connect external devices with the platform 900. The external devices connected to the platform 900 via the interface circuitry include sensor circuitry 921 and electro-mechanical components (EMCs) 922, as well as removable memory devices coupled to removable memory circuitry 923.

The sensor circuitry 921 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 922 include devices, modules, or subsystems whose purpose is to enable platform 900 to change its state, position, and/or orientation, or move or control a mechanism or (sub)system. Additionally, EMCs 922 may be configured to generate and send messages/signalling to other components of the platform 900 to indicate a current state of the EMCs 922. Examples of the EMCs 922 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 900 is configured to operate one or more EMCs 922 based on one or more captured events and/or instructions or control signals received from a service provider and/or various clients.

In some implementations, the interface circuitry may connect the platform 900 with positioning circuitry 945. The positioning circuitry 945 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 945 may include a Micro-PNT IC that uses a master timing clock to perform position tracking/estimation without GNSS assistance. The positioning circuitry 945 may also be part of, or interact with, the baseband circuitry 810 and/or RFEMs 915 to communicate with the nodes and components of the positioning network. The positioning circuitry 945 may also provide position data and/or time data to the application circuitry 905, which may use the data to synchronize operations with various infrastructure (e.g., radio base stations), for turn-by-turn navigation applications, or the like.

In some implementations, the interface circuitry may connect the platform 900 with Near-Field Communication (NFC) circuitry 940. NFC circuitry 940 is configured to provide contactless, short-range communications based on radio frequency identification (RFID) standards, wherein magnetic field induction is used to enable communication between NFC circuitry 940 and NFC-enabled devices external to the platform 900 (e.g., an "NFC touchpoint"). NFC circuitry 940 comprises an NFC controller coupled with an antenna element and a processor coupled with the NFC controller. The NFC controller may be a chip/IC providing NFC functionalities to the NFC circuitry 940 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 940, or initiate data transfer between the NFC circuitry 940 and another active NFC device (e.g., a smartphone or an NFC-enabled POS terminal) that is proximate to the platform 900.

The driver circuitry 946 may include software and hardware elements that operate to control particular devices that are embedded in the platform 900, attached to the platform 900, or otherwise communicatively coupled with the platform 900. The driver circuitry 946 may include individual drivers allowing other components of the platform 900 to interact with or control various input/output (I/O) devices that may be present within, or connected to, the platform 900. For example, driver circuitry 946 may include a display driver to control and allow access to a display device, a touchscreen driver to control and allow access to a touchscreen interface of the platform 900, sensor drivers to obtain sensor readings of sensor circuitry 921 and control and allow access to sensor circuitry 921, EMC drivers to obtain actuator positions of the EMCs 922 and/or control and allow access to the EMCs 922, a camera driver to control and allow access to an embedded image capture device, audio drivers to control and allow access to one or more audio devices.

The power management integrated circuitry (PMIC) 925 (also referred to as "power management circuitry 925") may manage power provided to various components of the platform 900. In particular, with respect to the baseband circuitry 910, the PMIC 925 may control power-source selection, voltage scaling, battery charging, or DC-to-DC conversion. The PMIC 925 may often be included when the platform 900 is capable of being powered by a battery 930, for example, when the device is included in a UE 701.

In some embodiments, the PMIC 925 may control, or otherwise be part of, various power saving mechanisms of the platform 900. For example, if the platform 900 is in an RRC_Connected state, where it is still connected to the RAN node as it expects to receive traffic shortly, then it may enter a state known as Discontinuous Reception Mode (DRX) after a period of inactivity. During this state, the platform 900 may power down for brief intervals of time and thus save power. If there is no data traffic activity for an extended period of time, then the platform 900 may transition off to an RRC_Idle state, where it disconnects from the network and does not perform operations such as channel quality feedback, handover, etc. The platform 900 goes into a very low power state and it performs paging where again it periodically wakes up to listen to the network and then powers down again. The platform 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 930 may power the platform 900, although in some examples the platform 900 may be mounted deployed in a fixed location, and may have a power supply coupled to an electrical grid. The battery 930 may be a lithium ion battery, a metal-air battery, such as a zinc-air battery, an aluminum-air battery, a lithium-air battery, and the like. In some implementations, such as in V2X applications, the battery 930 may be a typical lead-acid automotive battery.

In some implementations, the battery 930 may be a "smart battery," which includes or is coupled with a Battery Management System (BMS) or battery monitoring integrated circuitry. The BMS may be included in the platform 900 to track the state of charge (SoCh) of the battery 930. The BMS may be used to monitor other parameters of the battery 930 to provide failure predictions, such as the state of health (SoH) and the state of function (SoF) of the battery 930. The BMS may communicate the information of the battery 930 to the application circuitry 905 or other components of the platform 900. The BMS may also include an analog-to-digital (ADC) convertor that allows the application circuitry 905 to directly monitor the voltage of the battery 930 or the current flow from the battery 930. The battery parameters may be used to determine actions that the platform 900 may perform, such as transmission frequency, network operation, sensing frequency, and the like.

A power block, or other power supply coupled to an electrical grid may be coupled with the BMS to charge the battery 930. In some examples, the power block XS30 may be replaced with a wireless power receiver to obtain the power wirelessly, for example, through a loop antenna in the computer platform 900. In these examples, a wireless battery charging circuit may be included in the BMS. The specific charging circuits chosen may depend on the size of the battery 930, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 950 includes various input/output (I/O) devices present within, or connected to, the platform 900, and includes one or more user interfaces designed to enable user interaction with the platform 900 and/or peripheral component interfaces designed to enable peripheral component interaction with the platform 900. The user interface circuitry 950 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 900. The output device circuitry may also include speakers or other audio emitting devices, printer(s), and/or the like. In some embodiments, the sensor circuitry 921 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 900 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 10:
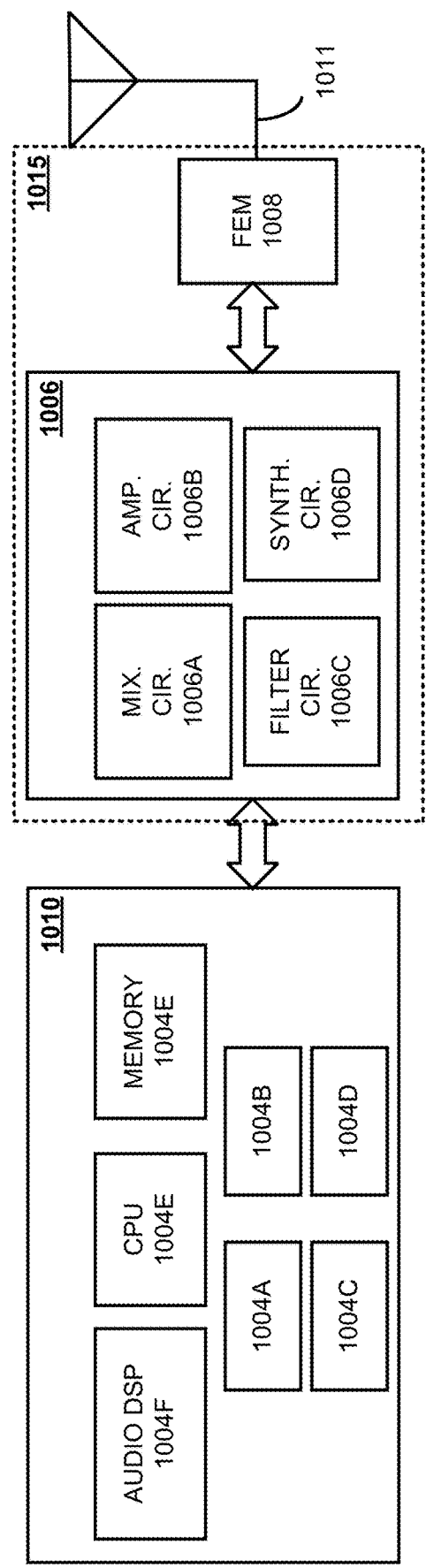
FIG. 10 illustrates example components of baseband circuitry and radio front end modules in accordance with various embodiments.

FIG. 10 illustrates example components of baseband circuitry 1010 and radio front end modules (RFEM) 1015 in accordance with various embodiments. The baseband circuitry 1010 corresponds to the baseband circuitry 810 and 910 of FIGS. 8 and 9, respectively. The RFEM 1015 corresponds to the RFEM 815 and 915 of FIGS. 8 and 9, respectively. As shown, the RFEMs 1015 may include Radio Frequency (RF) circuitry 1006, front-end module (FEM) circuitry 1008, antenna array 1011 coupled together at least as shown.

The baseband circuitry 1010 includes circuitry and/or control logic configured to carry out various radio/network protocol and radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1010 may include Fast-Fourier Transform (FFT), precoding, or constellation mapping/demapping functionality. In some embodiments, encoding/decoding circuitry of the baseband circuitry 1010 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1010 is configured to process baseband signals received from a receive signal path of the RF circuitry 1006 and to generate baseband signals for a transmit signal path of the RF circuitry 1006. The baseband circuitry 1010 is configured to interface with application circuitry 805/905 (see FIGS. 8 and 9) for generation and processing of the baseband signals and for controlling operations of the RF circuitry 1006. The baseband circuitry 1010 may handle various radio control functions.

The aforementioned circuitry and/or control logic of the baseband circuitry 1010 may include one or more single or multi-core processors. For example, the one or more processors may include a 3G baseband processor 1004A, a 4G/LTE baseband processor 1004B, a 5G/NR baseband processor 1004C, or some other baseband processor(s) 1004D for other existing generations, generations in development or to be developed in the future (e.g., sixth generation (6G), etc.). In other embodiments, some or all of the functionality of baseband processors 1004A-D may be included in modules stored in the memory 1004G and executed via a Central Processing Unit (CPU) 1004E. In other embodiments, some or all of the functionality of baseband processors 1004A-D may be provided as hardware accelerators (e.g., FPGAs, ASICs, etc.) loaded with the appropriate bit streams or logic blocks stored in respective memory cells. In various embodiments, the memory 1004G may store program code of a real-time OS (RTOS), which when executed by the CPU 1004E (or other baseband processor), is to cause the CPU 1004E (or other baseband processor) to manage resources of the baseband circuitry

1010, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1010 includes one or more audio digital signal processor(s) (DSP) 1004F. The audio DSP(s) 1004F include elements for compression/decompression and echo cancellation and may include other suitable processing elements in other embodiments.

In some embodiments, each of the processors 1004A-1004E include respective memory interfaces to send/receive data to/from the memory 1004G. The baseband circuitry 1010 may further include one or more interfaces to communicatively couple to other circuitries/devices, such as an interface to send/receive data to/from memory external to the baseband circuitry 1010; an application circuitry interface to send/receive data to/from the application circuitry 805/905 of FIGS. 8-XT); an RF circuitry interface to send/receive data to/from RF circuitry 1006 of FIG. 10; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 925.

In alternate embodiments (which may be combined with the above described embodiments), baseband circuitry 1010 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1010 may include protocol processing circuitry with one or more instances of control circuitry (not shown) to provide control functions for the digital baseband circuitry and/or radio frequency circuitry (e.g., the radio front end modules 1015).

Although not shown by FIG. 10, in some embodiments, the baseband circuitry 1010 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1010 and/or RF circuitry 1006 are part of mmWave communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1010 and/or RF circuitry 1006 are part of a Wi-Fi communication system. In the second example, the protocol processing circuitry would operate Wi-Fi MAC and logical link control (LLC) functions. The protocol processing circuitry may include one or more memory structures (e.g., 1004G) to store program code and data for operating the protocol functions, as well as one or more processing cores to execute the program code and perform various operations using the data. The baseband circuitry 1010 may also support radio communications for more than one wireless protocol.

The various hardware elements of the baseband circuitry 1010 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1010 may be suitably combined in a single chip or chipset, or disposed on a same circuit board. In another example, some or all of the constituent components of the baseband circuitry 1010 and RF circuitry 1006 may be implemented together such as, for example, a system on a chip (SoC) or System-in-Package (SiP). In another example, some or all of the constituent components of the baseband circuitry 1010 may be implemented as a separate SoC that is communicatively coupled with and RF circuitry 1006 (or multiple instances of RF circuitry 1006). In yet another example, some or all of the constituent components of the baseband circuitry 1010 and the application circuitry 805/905 may be implemented together as individual SoCs mounted to a same circuit board (e.g., a "multi-chip package").

In some embodiments, the baseband circuitry 1010 may provide for communication compatible with one or more radio technologies. For example, in some embodiments, the baseband circuitry 1010 may support communication with an E-UTRAN or other WMAN, a WLAN, a WPAN. Embodiments in which the baseband circuitry 1010 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path, which may include circuitry to down-convert RF signals received from the FEM circuitry 1008 and provide baseband signals to the baseband circuitry 1010. RF circuitry 1006 may also include a transmit signal path, which may include circuitry to up-convert baseband signals provided by the baseband circuitry 1010 and provide RF output signals to the FEM circuitry 1008 for transmission.

In some embodiments, the receive signal path of the RF circuitry 1006 may include mixer circuitry 1006a, amplifier circuitry 1006b and filter circuitry 1006c. In some embodiments, the transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1010 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1010 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a of the transmit signal path may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1010 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1010 or the application circuitry 805/905 depending on the desired output frequency. In some embodiments, a divider control input (e.g., N) may be determined from a look-up table based on a channel indicated by the application circuitry 805/905.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path, which may include circuitry configured to operate on RF signals received from antenna array 1011, amplify the received signals and provide the amplified versions of the received signals to the RF circuitry 1006 for further processing. FEM circuitry 1008 may also include a transmit signal path, which may include circuitry configured to amplify signals for transmission provided by the RF circuitry 1006 for transmission by one or more of antenna elements of antenna array 1011. In various embodiments, the amplification through the transmit or receive signal paths may be done solely in the RF circuitry 1006, solely in the FEM circuitry 1008, or in both the RF circuitry 1006 and the FEM circuitry 1008.

In some embodiments, the FEM circuitry 1008 may include a TX/RX switch to switch between transmit mode and receive mode operation. The FEM circuitry 1008 may include a receive signal path and a transmit signal path. The receive signal path of the FEM circuitry 1008 may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission by one or more antenna elements of the antenna array 1011.

The antenna array 1011 comprises one or more antenna elements, each of which is configured convert electrical signals into radio waves to travel through the air and to convert received radio waves into electrical signals. For example, digital baseband signals provided by the baseband circuitry 1010 is converted into analog RF signals (e.g., modulated waveform) that will be amplified and transmitted via the antenna elements of the antenna array 1011 including one or more antenna elements (not shown). The antenna elements may be omnidirectional, direction, or a combination thereof. The antenna elements may be formed in a multitude of arranges as are known and/or discussed herein. The antenna array 1011 may comprise microstrip antennas or printed antennas that are fabricated on the surface of one or more printed circuit boards. The antenna array 1011 may be formed in as a patch of metal foil (e.g., a patch antenna) in a variety of shapes, and may be coupled with the RF circuitry 1006 and/or FEM circuitry 1008 using metal transmission lines or the like.

Processors of the application circuitry 805/905 and processors of the baseband circuitry 1010 may be used to execute elements of one or more instances of a protocol stack. For example, processors of the baseband circuitry 1010, alone or in combination, may be used execute Layer 3, Layer 2, or Layer 1 functionality, while processors of the application circuitry 805/905 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 11:
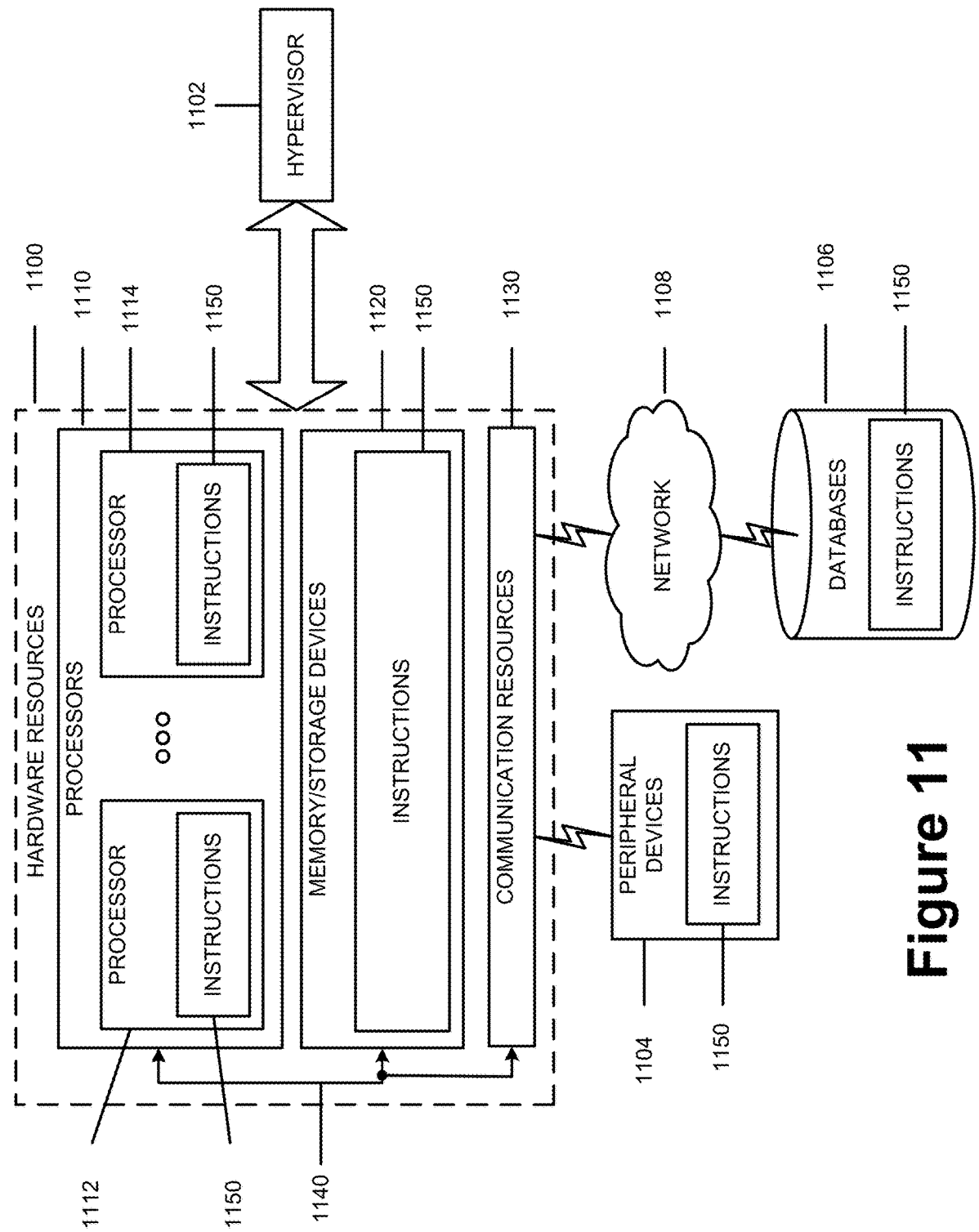
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

Example Procedures

Figure 12:
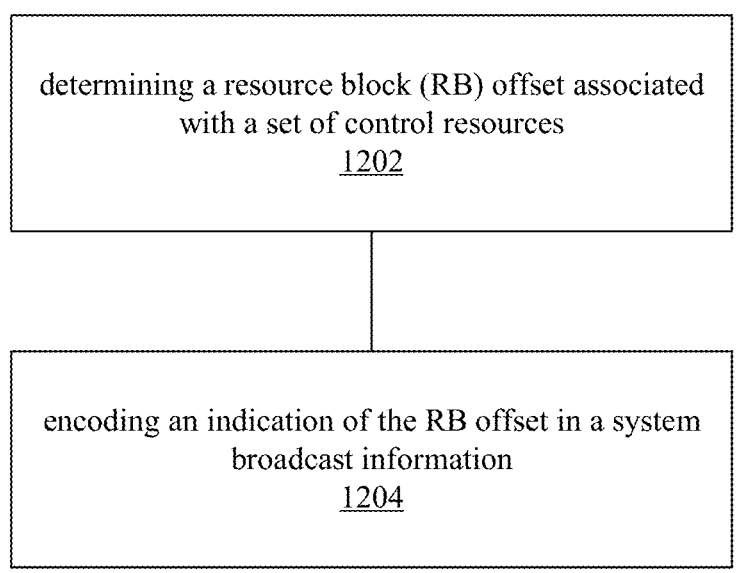
FIG. 12 illustrates a process of a gNB in accordance with various embodiments.

In some embodiments, the electronic device(s), network(s), system(s), chip(s) or component(s), or portions or implementations thereof, of FIGS. 7-11, or some other figure herein, may be configured to perform one or more processes, techniques, or methods as described herein, or portions thereof. One such process is depicted in FIG. 12. For example, the process may include, at 1202, determining a resource block (RB) offset associated with a set of control resources. At 1204, the process may further include encoding an indication of the RB offset in a system broadcast information.

Figure 13:
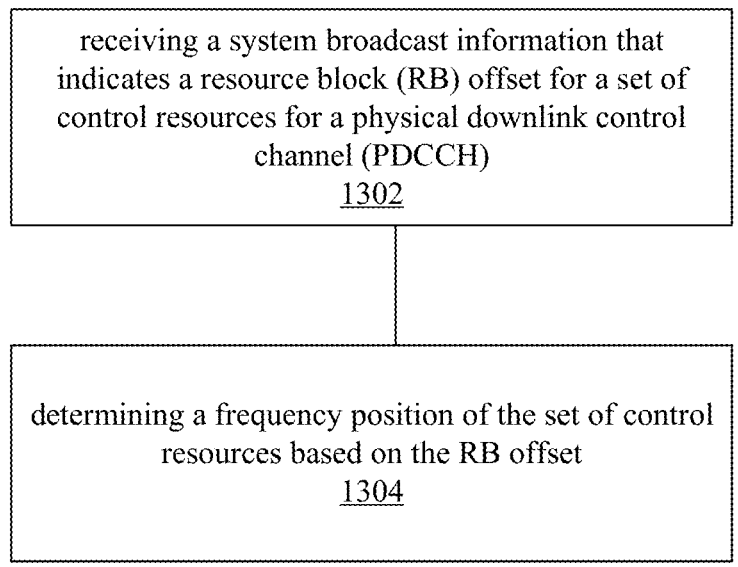
FIG. 13 illustrates a process of a UE in accordance with various embodiments.

Another such process is depicted in FIG. 13. For example, the process may include, at 1302, receiving a system broadcast information that indicates a resource block (RB) offset for a set of control resources for a physical downlink control channel (PDCCH). At 1304, the process may further include determining a frequency position of the set of control resources based on the RB offset.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method, comprising: determining a resource block (RB) offset associated with a set of control resources; and encoding an indication of the RB offset in a system broadcast information.

Example 2 may include the method of example 1 or some other example herein, wherein a frequency position of the set of control resources is indicated according to a first mode or a second mode.

Example 3 may include the method of example 2 or some other example herein, wherein the first mode is to use a combination of a RB offset signaling and a frequency gap between an indicated SS/PBCH and a reference SS/PBCH frequency for a given frequency range, or the second mode is to use RB offset signaling.

Example 4 may include the method of examples 1-3 or some other example herein, wherein the control resources are associated with a CORESET.

Example 5 may include the method of examples 2-4 or some other example herein, wherein a payload of PBCH is used to indicate whether the first or second mode is used.

Example 6 may include the method of examples 1-5 or some other example herein, wherein, in the first mode, the RB offset is indicated by a summation of an offset indication in the PBCH and frequency difference between the SS/PBCH block containing the offset indication, and reference SS/PBCH block for the given channel.

Example 7 may include the method of examples 1-5 or some other example herein, wherein, in the second mode, the RB offset is indicated by an offset indication in a PDCCH-ConfigSIB1 field of the PBCH information payload.

Example 8 may include the method of examples 1-5 or some other example herein, wherein, in the second mode, the RB offset is indicated by an offset indication in a subset of the bits of repurposed subCarrierSpacingCommon field of the PBCH information payload.

Example 9 may include the method of examples 1-5 or some other example, wherein the RB offset is indicated by summation of first and second offset indications, wherein the first offset indication is provided by a subset of the bits of a subCarrierSpacingCommon field of a PBCH information payload and the second offset indication is provided by a PDCCH-ConfigSIB1 field of the PBCH information payload.

Example 10 may include the method of example 9 or some other example herein, wherein the second offset indication indicates one or more RB offset values of {0,1,2,3, 28,29,30,31} and the first offset indication indicates an RB offset value of {0,4,8,12} or {0, −4, −8, −2}, depending on whether the second offset indication indicates one or more values from set {0,1,2,3} or set {28,29,30,31}, respectively.

Example 11 may include the method of examples 1-10 or some other example herein, wherein the RB offset is indicated by a summation of the offset indication provided by PDCCH-ConfigSIB1 field of the PBCH information payload, and a frequency difference between the SS/PBCH block containing the offset indication and reference SS/PBCH block for the given channel.

Example 12 may include the method of examples 1-11 or some other example herein, further comprising generating a signal in the PBCH information payload to indicate a RB offset definition to use.

Example 13 may include the method of examples 12 or some other example herein, wherein the RB offset definition includes an original RB offset and an alternative RB offset.

Example 14 may include the method of examples 1-13 or some other example herein, further comprising using the subCarrierSpacingCommon field of the PBCH information payload to signal the RB offset definition selection.

Example 15 may include the method of examples 1-14 or some other example herein, wherein a subset of the bits of the subCarrierSpacingCommon field of the PBCH information payload includes an RB offset value of {0,4,8,12, 16,20,24,28}.

Example 16 may include the method of example 6 or some other example herein, wherein the RB offset is indicated by the offset indication in PDCCH-ConfigSIB1 field of the PBCH information payload represents RB offset values of {0,1,2,3}.

Example 17 may include the method of example 6 or some other example herein, wherein the reference SSB is a frequency, among the list of SSB raster entries, that is closest or nearest to the target SSB frequency and is smaller than or equal to the target SSB frequency, wherein the list of SSB raster entries is a list of potential reference SSB frequencies.

Example 18 may include the method of example 6 or some other example herein, wherein the reference SSB is a frequency, among the list of SSB raster entries, that is closest or nearest to the target SSB frequency and is greater than or equal to the target SSB frequency, wherein the list of SSB raster entries is a list of potential reference SSB frequencies.

Example 19 may include the method of example 6 or some other example herein, wherein the reference SSB is determined based on a first scheme in which the reference SSB corresponds to a frequency among the list of SSB raster entries that is closest or nearest to the target SSB frequency and is smaller than or equal to the target SSB frequency, or a second scheme in which the reference SSB corresponds to a frequency among the list of SSB raster entries that is closest or nearest to the target SSB frequency and is greater than or equal to the target SSB frequency, wherein the list of SSB raster entries is a list of potential reference SSB frequencies.

Example 20 may include the system and method of example 19 or some other example herein, wherein a reference SSB calculation method among the first scheme or the second scheme is determined by gNB assistance information.

Example 21 may include the method of examples 20 or some other example herein, wherein the gNB assistance information is indicated as part of measurement configuration for CGI reporting.

Example 22 may include the method of examples 20 or some other example herein, wherein the gNB assistance information is indicated as part of MIB (payload of PBCH).

Example 23 may include the method of example 22 or some other example herein, wherein the gNB assistance information is indicated implicitly with PDCCH-ConfigSIB1 information element.

Example 24 may include the method of example 22 or some other example herein, wherein the gNB assistance information that indicate the choice of which method to use the compute the reference SSB is determined based on set of indices of the PDCCH-ConfigSIB1 that indicate the bandwidth, number of OFDM symbols for control channel, and offset between CORESET #0 and SSB.

Example 25 may include the method of examples 1-24, or some other examples herein, wherein the method is performed by an access node (e.g., a gNB) or a portion thereof.

Example 26 may include a method, comprising: receiving a system broadcast information that indicates a resource block (RB) offset for a set of control resources for a physical downlink control channel (PDCCH); and determining a frequency position of the set of control resources based on the RB offset.

Example 27 may include the method of example 26, or some other example herein, wherein to determine the frequency position of the set of control resources is to determine the frequency position of the set of control resources based on a first mode or a second mode.

Example 28 may include the method of example 27, or some other example herein, further comprising determining whether to use the first mode or the second mode based on a payload of a PBCH.

Example 29 may include the method of example 26-28, or some other example herein, wherein the method is performed by a UE or a portion thereof.

Example 30 may include an apparatus comprising means to perform one or more elements of a method described in or related to any of examples 1-29, or any other method or process described herein.

Example 31 may include one or more non-transitory computer-readable media comprising instructions to cause an electronic device, upon execution of the instructions by one or more processors of the electronic device, to perform one or more elements of a method described in or related to any of examples 1-29, or any other method or process described herein.

Example 32 may include an apparatus comprising logic, modules, or circuitry to perform one or more elements of a method described in or related to any of examples 1-29, or any other method or process described herein.

Example 33 may include a method, technique, or process as described in or related to any of examples 1-29, or portions or parts thereof.

Example 34 may include an apparatus comprising: one or more processors and one or more computer-readable media comprising instructions that, when executed by the one or more processors, cause the one or more processors to perform the method, techniques, or process as described in or related to any of examples 1-29, or portions thereof.

Example 35 may include a signal as described in or related to any of examples 1-29, or portions or parts thereof.

Example 36 may include a datagram, packet, frame, segment, protocol data unit (PDU), or message as described in or related to any of examples 1-29, or portions or parts thereof, or otherwise described in the present disclosure.

Example 37 may include a signal encoded with data as described in or related to any of examples 1-29, or portions or parts thereof, or otherwise described in the present disclosure.

Example 38 may include a signal encoded with a datagram, packet, frame, segment, protocol data unit (PDU), or message as described in or related to any of examples 1-29, or portions or parts thereof, or otherwise described in the present disclosure.

Example 39 may include an electromagnetic signal carrying computer-readable instructions, wherein execution of the computer-readable instructions by one or more processors is to cause the one or more processors to perform the method, techniques, or process as described in or related to any of examples 1-29, or portions thereof.

Example 40 may include a computer program comprising instructions, wherein execution of the program by a processing element is to cause the processing element to carry out the method, techniques, or process as described in or related to any of examples 1-29, or portions thereof.

Example 41 may include a signal in a wireless network as shown and described herein.

Example 42 may include a method of communicating in a wireless network as shown and described herein.

Example 43 may include a system for providing wireless communication as shown and described herein.

Example 44 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment"

or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory, computer-readable media (NTCRM) having instructions, stored thereon, that when executed cause a next generation Node B (gNB) to:
   determine a resource block (RB) offset associated with a set of control resources; and
   encode an indication of the RB offset in a system broadcast information, wherein the RB offset is to indicate a frequency position of the set of control resources according to a first mode or a second mode.

2. The one or more NTCRM of claim 1, wherein the first mode is to use a combination of a RB offset signaling and a frequency gap between an indicated synchronization signal (SS)/physical broadcast channel (PBCH) and a reference SS/PBCH frequency for a given frequency range, or the second mode is to use the RB offset signaling.

3. The one or more NTCRM of claim 1, wherein a payload of physical broadcast channel (PBCH) is used to indicate whether the first or second mode is used.

4. The one or more NTCRM of claim 1, wherein, in the first mode, the RB offset is indicated by a summation of an offset indication in a physical broadcast channel (PBCH) and a frequency difference between a synchronization signal (SS)/PBCH block containing the offset indication, and a reference SS/PBCH block for a given channel.

5. The one or more NTCRM of claim 1, wherein, in the second mode, the RB offset is indicated by an offset indication in a physical downlink control channel (PDCCH) system broadcast information (PDCCH-ConfigSIB1) field of a physical broadcast channel (PBCH) information payload.

6. The one or more NTCRM of claim 1, wherein, in the second mode, the RB offset is indicated by an offset indication in a subset of bits of a subCarrierSpacingCommon field of a physical broadcast channel (PBCH) information payload.

\* \* \* \* \*